Dec. 12, 1961 H. DA COSTA 3,012,788

PHONOGRAPH RECORD CHANGERS

Filed Dec. 21, 1956 2 Sheets-Sheet 1

3,012,788

PHONOGRAPH RECORD CHANGERS

Harry Da Costa, Chicago, Ill., assignor to The Plessey Company Limited, Ilford, England, a British company Filed Dec. 21, 1956, Ser. No. 630,001
Claims priority, application Great Britain Feb. 29, 1956
4 Claims. (Cl. 274—10)

Figure 1:
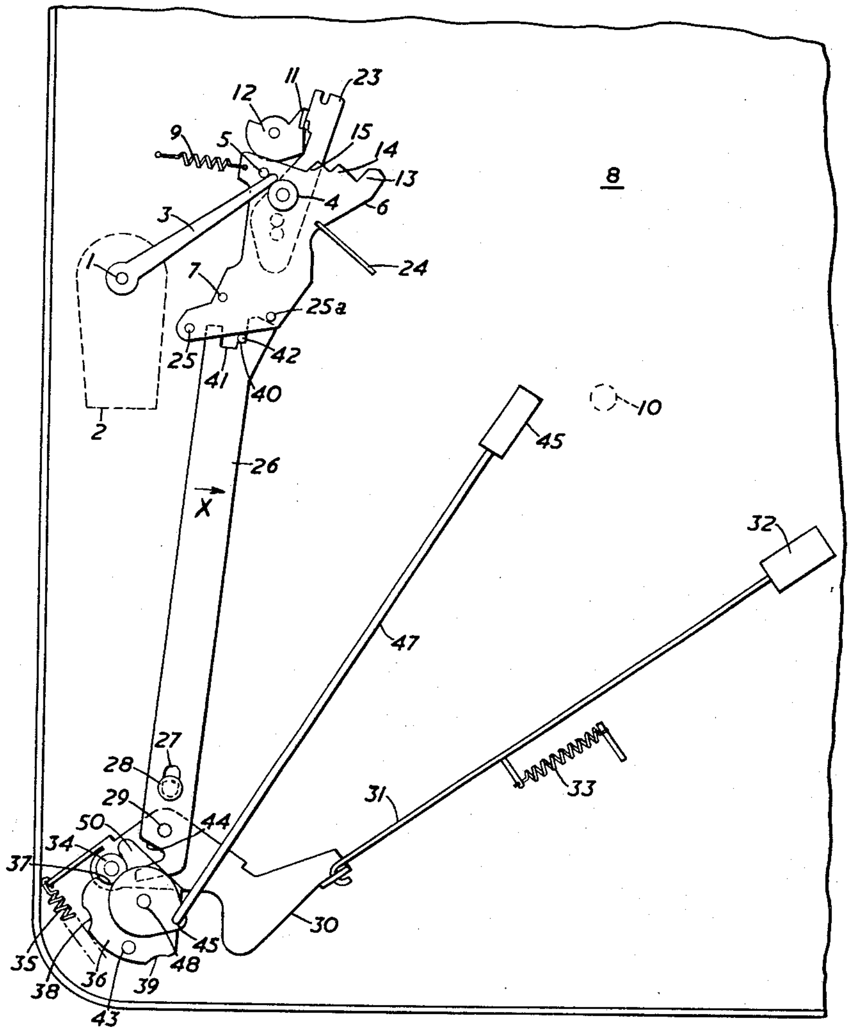

This invention relates to phonographs which are equipped with a plural-speed drive and with automatic record-changing mechanism and means for selecting the starting position of the tone arm according to the diameter of the record placed on the turntable by said mechanism. Record discs are at present normally made in three standard sizes, respectively 7", 10" or 12" in diameter, and while apart from 16 r.p.m. records, which may be in all three sizes, the 10" and 12" sizes are normally made for a speed of either 78 or 33⅓ r.p.m., 7" records are at present invariably made for a speed of either 78 or 45 r.p.m.

Moreover, different kinds of grooves requiring the use of different styli are in use, a relatively coarse-pitch groove, which is used in records made for 78 r.p.m., and so-called micro-grooves, which are used for all lower speeds, and since a micro-groove record is liable to be damaged by a stylus made for the coarser grooves, it is not advisable to use 78 r.p.m. records in a record changer in mixture with other records. 16 r.p.m. records use a finer groove and lighter pick-up weight, than 33 r.p.m. and 45 r.p.m. records; therefore they are unlikely to be used in mixture with either. While on the other hand it is safe and often desirable to use in a record-changing phonograph 45 r.p.m. and 33⅓ r.p.m. records in mixture, this has hitherto been impracticable because manual intervention was necessary in order to change the playing speed when a 45 r.p.m. record is followed by a 33⅓ r.p.m. record and vice versa. The present invention provides means for automatically changing the playing speed according to the diameter of a record. According to a more specific aspect of the invention means are provided which effect automatically a selection of one or the other of two predetermined playing speeds, for example 45 and 33⅓ r.p.m., according to the diameter of each record released from the magazine.

It is an object of the invention to provide improved speed selector mechanism in phonograph record changers having a feeler member for determining the positioning of the tone arm to start play, which speed selector mechanism is automaticaly affected by the diameter of a record which is being deposited on the turntable without thereby increasing the mechanical resistance encountered by the record on its way to the turntable.

In carrying out the invention a feeler member which is arranged to be differentially actuated by the edge portion of records of different size as they drop from the stack on to the turntable, is utilised for controlling both the speed at which the turntable is driven and the positioning of the tone arm according to the record diameter.

One form of speed-control device incorporating the invention is illustrated in the accompanying drawings.

Figures 2, 3, 4, 5:
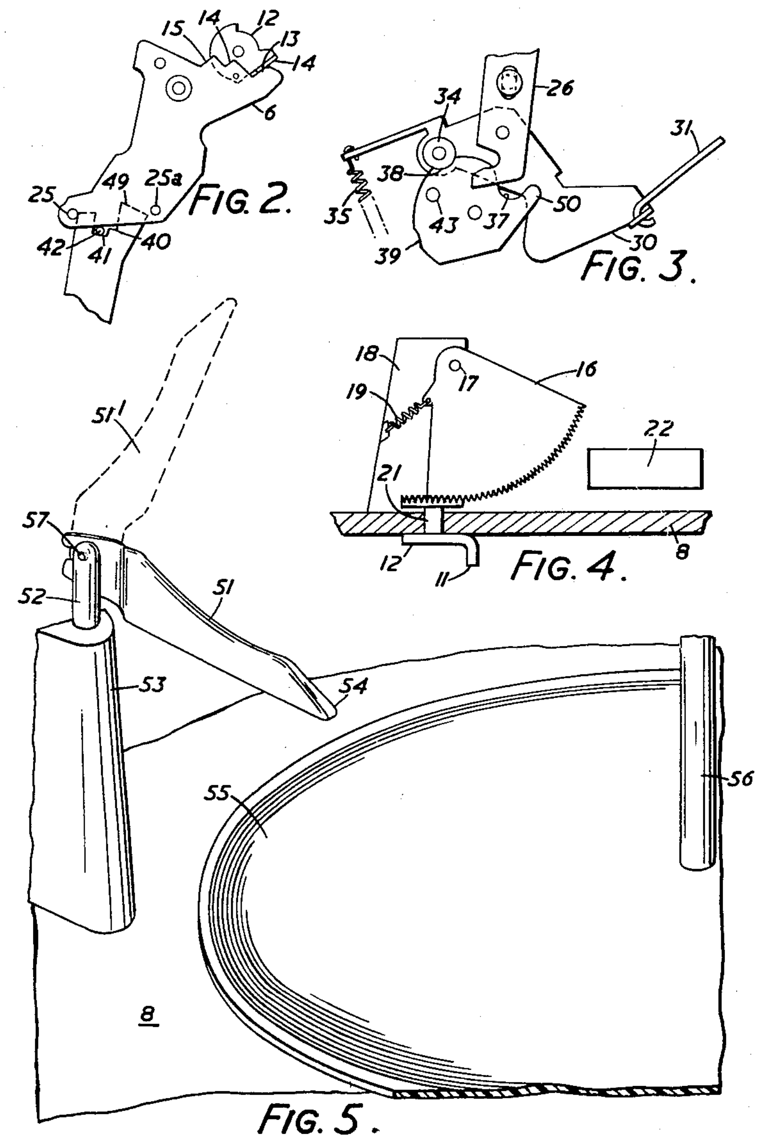

FIG. 1 is a fragmentary underneath plan view of the base of a phonograph having a centre-spindle type automatic record changer equipped with a feeler controlled tone-arm positioning device and with the device according to the invention, which is shown in the "off" position with the manual speed control member set for 78 r.p.m., FIG. 2 shows part of the mechanism in the position for playing a 7" record at 45 r.p.m., FIG. 3 shows the manual speed-control device in the position in which 10" and 12" records will be played at 33 r.p.m., and FIG. 4 schematically shows the operation of one form of record-size feeler, while FIG. 5 shows an alternative form of record-size feeler.

Referring to FIG. 1 a shaft 1, on which the tone arm 2 is secured, carries a cam arm 3 which, when the tone arm is raised in the usual manner when no record is being played, co-operates with a roller 4 and a pin 5 of a positioning or teasing lever 6. This lever is pivoted at 7 in the phonograph base 8. In FIG. 1 is is shown in its normal "off" position corresponding to the position of the tone arm 2 to which it is automatically moved before the dropping of a record off the stack, in a manner common to automatic record changers. A spring 9 urges the lever 6 to move in a direction in which the roller 4, by means of cam arm 3, will move the tone arm 2 towards the turntable spindle 10 as soon as it is free to do so, prior to the lowering of the tone arm 2 on to the record. This inward movement of the teasing lever 6 is limited by a stop 11. The latter projects from a disc 12, which is spring-biased to the position shown in FIG. 1, in which the lever 6 is free to rotate until the stop 11 is struck by part 13 of a stepped abutment surface 13, 14, 15, thus positioning the tone arm for the beginning of the sound track of a 7" record disc. The disc 12 is arranged to be set by a record size feeler, which is actuated by each 10" or 12" record on its way from the magazine stack to the turntable. A simple mechanism suitable for the purpose is schematically shown in FIG. 4, while a preferred form is shown in FIG. 5. In the form illustrated in FIG. 4 the feeler is a toothed segment 16, which is pivoted at 17 in a bracket 18 projecting upwardly from the base 8, a spring 19 being provided for restoring the segment 16 to its illustrated normal position. The segment 16 co-operates with a bevel gear 20, which is connected with disc 12 for common rotation by a shaft 21. When a 7" record is released and moves down vertically on to the turntable 22, its edge will pass outside the segment 16, and disc 12 will therefore remain in the position shown in FIGS. 1 and 2. 10" and 12" records will move segment 16, thereby turning disc 12 so as to move its stop 11 out of the path of abutment surface 13 and into that of abutment surface 14 or 15; the disc 12 is then retained in this position by a spring loaded latch 23. The drive mechanism for the resetting of the tone arm, which is indicated by a pull rod 24, is arranged to move, after the playing of each record, the lever 6 against the action of spring 9 beyond the position shown in FIG. 1, thus causing cam arm 3 to lift latch 23, so as to allow spring 19 to restore disc 12 and sector 16 to the illustrated normal position.

Immediately after the release of a record and the consequential setting of disc 12 by the record, the movement of pull rod 24 is reversed, whereupon spring 9 will move lever 6 and, through roller 4, the tone arm 2 to follow this movement until one or the other of surfaces 13, 14, 15, according to the position to which disc 12 has been set, strikes the stop 11, thus selectively positioning the tone arm for the starting groove of the record last released. In order to utilise this selective movement of the teasing lever 6 for selecting the speed when 45 r.p.m. and 33 r.p.m. records are being used in mixture, the lever 6 is further provided with two abutment pins 25 and 25*a* for co-operation with one end of a speed-selector latch 26, which is guided by a slot 27 co-operating with a pin 28 on the base 8, about which the latch can pivot, and on which it can slide along the slot. The other end of the latch 26 is pivoted at 29 to a central point of a floating speed-control lever 30, one end of which is hitched to the control element 31 of a change-speed mechanism 32, while its other end co-operates with a manually operable speed-selector cam 36 mounted on a rotatable shaft 48. The latter end of floating lever 30 carries a roller 34, and a spring 35 urges this roller into contact with the speed-selector cam 36 in a direction more or less perpendicular to the rod-shaped control element 31. A tension spring 33 urges the control element 31 to the 78 r.p.m. position. The cam 36 has three notches 37, 38 and 39 of different radial distance from the axis of a shaft 48. They respectively correspond to 78, 33⅓ or 45, and 16 r.p.m., and by manually turning the cam 36, any one of notches 37, 38 and 39 can be selectively brought into engagement with the roller 34 on lever 30.

As a result, if latch 26 remains in the position shown in FIG. 1, rotation of cam 30 by a suitable knob at the upper side of base 8 from one position to another will rock lever 30 about pivot 29 to alter the setting of mechanism 32.

The end of latch 26 adjacent to the lever 6 has a stepped recess 40, 41, adapted to co-operate with a stop pin 42 fixed in the base, against which the recess is held by the action of spring 33, which is transmitted through the lever 30, the roller 34 acting as fulcrum. When the apparatus is in the position shown in FIG. 1 and a 7″ record drops on to the turntable, segment 16 and disc 12 remain in the illustrated positions, so that the teasing lever 6 will move to the position shown in FIG. 2. During this movement the pin 25 on the teasing lever 6 will strike the latch 26 and move its adjacent end in the direction of arrow X of FIG. 1, thereby disengaging the step 40 from the pin 42. This allows the spring 33 to rock the lever 30 about the roller 34 until the bottom 41 of the stepped recess 40, 41, strikes the pin 42 as shown in FIG. 2. Assuming now that the cam 36 is in the "33⅓ or 45 r.p.m." position, illustrated in FIG. 3, in which the roller 34 rests in notch 38, this rocking movement of lever 30 will involve movement of rod 31 towards mechanism 32 of such magnitude as to change the speed from 33⅓ to 45 r.p.m. When the playing of the 7″ record is completed, and the tone arm 2, cam lever 3, and teasing lever 6 return to the position of FIG. 1, the second abutment pin **25*a* strikes an inclined surface 49 at the adjacent end of latch member 26**, whereby the latch member is likewise restored to its normal position shown in FIG. 1.

Assuming now that the next record to be released is a 10″ or 12″ record, this record will strike segment 16 to turn disc 12 from the illustrated position with the result that the movement of the teasing lever 6 under spring 9 will be terminated when either the step 14 or the step 15 strikes the stop 11. It will thus come to an end before the pin 25 reaches the edge of the latch 26, and as a result the latch will remain in the position shown in FIG. 1, in which the step 40 rests against pin 42 so that, provided the speed control cam 36 is still in the "33⅓ or 45 r.p.m." position the mechanism 32 remains set at 33⅓ r.p.m.

It will be appreciated that, as the 78 r.p.m. and 16 r.p.m. speeds are each applicable to records of all three sizes, the arrangement must be such that the action of pin 25 on latch 26 after the dropping of a 7″ record must not be allowed to affect the speed set by mechanism 32 if the cam 36 is in either the 16 r.p.m. position or the 78 r.p.m. position.

For this reason the latch 26 is extended beyond the pivot point 29 and formed with a hook 44, while the cam 36 carries a pin 43 which engages the said hook 44 when the cam is in the 16 r.p.m. position, in which the roller 34 rests in the notch 39. It will be appreciated that when this is the case, the pin 43 will prevent the latch 26 from moving outwardly under the action of spring 33 and lever 30 when pin 25 displaces the upper end of latch 26 so as to disengage the step 40 from the pin 42. Lever 30 is therefore unable to pivot about the axis of roller 34; no movement of rod 31 will take place, and the setting of speed control mechanism 32 to the 16 r.p.m. speed remains unaffected so that the speed is availabe for records of all three sizes. A similar result could be achieved in the 78 r.p.m. position by providing a second pin similar to pin 43 on cam 36 and a second hook-like recess, similar to recess 44, at the opposite side of latch 26; in practice however this is not normally necessary in view of the fact that no speed higher than 78 r.p.m. is normally provided in a record changer so that the slight further movement of rod 31 in the direction of higher speed resulting from the outward movement of latch 26 upon being struck by pin 25 will not produce any further alteration of speed. A tongue-like extension 50 of the cam 36 is provided for preventing further movement of the cam beyond the 78 r.p.m. position.

FIG. 5 shows a modified form of feeler device which may be used in place of a feeler device illustrated in FIG. 4, and which avoids the necessity of using a gear connection between the feeler member proper and the shaft of the cam 12. The feeler consists of an arm 51 which normally extends substantially horizontally from a spindle 52 which carries the disc 12 at its lower end, and which is supported in a pillar 53 extending from the gramophone base plate 8. The upper surface of the lever 51 is provided with a downwardly sloping ramp 54, and the lever 51 is so shaped and arranged relative to the turntable 55 that while being left unaffected by records of 7″ diameter dropping down the centre spindle 56, it will be struck by records of 10″ or 12″ diameter and, by co-operation of the edge of the record with the ramp 54, turned about the axis of spindle 52 to move stop 11 on cam 12 into co-operation with abutment edge 14 or 15 respectively of the teasing lever 6. In order to allow played records to be lifted off the turntable along the spindle 56 without rotation of the spindle 52, the arm 51 is pivoted to the spindle 52 by a horizontal pin 57 in such manner that on the one hand the arm 51 can be raised to the position shown in broken lines at 51—while the arm is, by suitable stop means, prevented from being lowered beyond the position shown in FIG. 5.

Actuating means for an on-off switch 45 of the phonograph motor may conveniently be provided coaxially with the speed-selector cam 36. In the illustrated embodiment the shaft 48 about which cam 36 rotates, is rotatable by a switch handle and carries a crank arm 46, to which a switch-actuating link 47 is pivoted.

The invention is not limited to the illustrated embodiment, for example the movement of lever 6 to the 7″ position might be utilised for the actuation of mechanism superseding the manual speed selection, or for varying an electric circuit controlling the turntable speed. Furthermore the speed change, instead of being controlled by the teasing lever 6, may be controlled by the stop disc 12.

What I claim is:

1. In a record-changer phonograph having a phonograph drive a turntable rotatable by said drive, disc-record storage means above said turntable, means for releasing individual records from said storage means and for guiding each released record on to the turntable, a pickup arm having a stylus for co-operation with such record on the turntable, said pickup arm being movable downwardly for engagement of said stylus with such record on the turntable and upwardly to a raised position for disengagement of said stylus with such record, and movable horizontally between an outer position clear of the path of records moving from the storage means to the turntable and an inner position in which the stylus is near the centre of the turntable, change-cycle mechanism operated by the drive, when the play of one record has been completed, to successively move the pickup arm upwardly to said raised position, move the pickup arm horizontally to said outer position, release another record from the storage means, move the pickup arm horizontally to a predetermined position intermediate between the said outer and inner positions, and lower the pickup arm to engage the stylus with the record thus released, said change-cycle mechanism including a teasing member movable between a first and a second position, means coupling the pickup arm to the teasing member when the pickup arm is in its raised position for moving the pickup arm from its inner to its outer position when the teasing member is moved from its first to its second position, and moving the pickup arm from said outer position towards its inner position when the teasing member is moved towards its first position, spring means biasing the teasing member to its first position, and a unidirectional coupling positively driving the teasing member for movement to its second position while allowing the movement of the teasing member towards its first position to be effected by the teasing spring means, adjustable stop means for co-operation with the teasing member to selectively terminate at one or other of a plurality of predetermined positions the pickup-arm positioning movement of the teasing member from its second towards its first position, a feeler member having a normal position in which it projects into a marginal portion of the path of a record moving from said storage means to said turntable and having a diameter greater than a predetermined diameter, said feeler member being movable by such larger record to a position clear of said path, means actuable by such operation of the feeler member to adjust said stop means for terminating such inward movement of the pickup arm at a position corresponding to the starting groove of such larger-diameter record, said change-cycle mechanism being operative after the termination of the play of each record and before the release of the next record from the storage means to restore said stop means to a position corresponding to the starting groove of records having said predetermined diameter, and to return said feeler member to said normal position: the combination comprising a speed-selector device co-operating with the phonograph drive to selectively drive the turntable at one or other of at least two different speeds, a manually operable control member for said speed selector device, a lever pivoted at one point of the lever for movement about a fulcrum, a second point of said lever being pivotally coupled to said control member in such manner that positional change of the control member between at least one position and at least one other position produces pivotal movement of the lever about the fulcrum, a third point on said lever being pivotally coupled to said selector device in such manner that such pivotal movement of the lever about its fulcrum produces movement of the speed selector device to effect a speed change between a first and a second speed, and automatic fulcrum control means operatively connected to said teasing member during the positioning movement thereof for causing according to the point at which such positioning movement is terminated, said fulcrum to be supported at one or the other of two positions so spaced from each other transversely of the line containing the two said pivotal coupling points of the lever, as to cause, when the control member is in a predetermined position, the point of pivotal coupling to the speed selector pivot to assume selectively one or the other of two positions corresponding to two different speeds.

2. In a phonograph record changer, the combination claimed in claim 1 and including a manual control element coupled to the speed selector device and having a plurality of operative positions for setting said selector device to produce selectively different turntable speeds, and means operated by the manual control device which render the automatic control means operative except when the manual control element is in a predetermined one of said operative positions.

3. The combination as claimed in claim 2, wherein the manual control element, the automatic control means, and the speed-selector device are intercoupled by differential mechanism, the combination including locking means locking said differential mechanism against the influence of the automatic control means when said manual control element is in a position other than said predetermined position, the automatic speed-change mechanism being coupled resiliently to said differential member.

4. A device as claimed in claim 3, wherein the differential member comprises a floating lever two points of which are respectively coupled to the speed-selector device and the manual control element, the automatic control means including a longitudinally guided elongated member unidirectionally coupled with the teasing lever, and the manual control element including a rotatable cam on which a further point of said floating lever bears, said cam being provided with an axially extending locking pin, and said elongated member being provided with a locking surface arranged for co-operation with said pin to prevent longitudinal movement of said elongated member when the manual control element is in a position other than said predetermined position.

References Cited in the file of this patent

UNITED STATES PATENTS

| | | |
|---|---|---|
| 2,632,650 | Offutt | Mar. 24, 1953 |
| 2,646,688 | Slough | July 28, 1953 |
| 2,752,159 | Bacher | June 26, 1956 |
| 2,776,838 | Mueller | Jan. 8, 1957 |
| 2,823,039 | Collaro et al. | Feb. 11, 1958 |
| 2,885,208 | Pranter | May 5, 1959 |
| 2,939,714 | Dennis | June 7, 1960 |
| 2,956,830 | Dennis | Oct. 18, 1960 |

FOREIGN PATENTS

| | | |
|---|---|---|
| 767,884 | Great Britain | Feb. 6, 1957 |
| 1,092,870 | France | Apr. 27, 1955 |